United States Patent [19]
Kasser

[11] Patent Number: 6,002,389
[45] Date of Patent: Dec. 14, 1999

[54] TOUCH AND PRESSURE SENSING METHOD AND APPARATUS

[75] Inventor: Bernard Kasser, Redwood City, Calif.

[73] Assignee: Logitech, Inc., Fremont, Calif.

[21] Appl. No.: 08/935,511

[22] Filed: Sep. 23, 1997

Related U.S. Application Data

[63] Continuation-in-part of application No. 08/637,099, Apr. 24, 1996.

[51] Int. Cl.$^6$ .................................................. G09G 5/00
[52] U.S. Cl. ................... 345/173; 178/18.01; 178/18.06
[58] Field of Search ........................ 345/173; 178/18.01, 178/18.06

[56] References Cited

U.S. PATENT DOCUMENTS

| | | |
|---|---|---|
| 3,921,166 | 11/1975 | Volpe . |
| 4,103,252 | 7/1978 | Bobick . |
| 4,455,452 | 6/1984 | Schuyler . |
| 4,516,112 | 5/1985 | Chen ........................................ 340/365 |
| 4,550,221 | 10/1985 | Mabusth . |
| 4,639,720 | 1/1987 | Rympalski et al. . |
| 4,686,332 | 8/1987 | Greanias et al. . |
| 4,698,460 | 10/1987 | Krein et al. . |
| 4,733,222 | 3/1988 | Evans . |
| 4,736,191 | 4/1988 | Matzke et al. . |
| 4,740,781 | 4/1988 | Brown ..................................... 345/174 |
| 4,812,833 | 3/1989 | Shimauchi . |
| 5,016,008 | 5/1991 | Gruaz et al. . |
| 5,305,017 | 4/1994 | Gerpheide . |
| 5,386,219 | 1/1995 | Greanias et al. ......................... 345/174 |
| 5,398,046 | 3/1995 | Szegedi et al. .......................... 345/174 |
| 5,463,388 | 10/1995 | Boie et al. ................................. 341/33 |
| 5,488,204 | 1/1996 | Mead et al. ........................... 178/18.06 |
| 5,495,077 | 2/1996 | Miller et al. . |
| 5,541,370 | 7/1996 | Matsuda et al. ...................... 178/18.05 |
| 5,543,589 | 8/1996 | Buchana et al. ..................... 178/18.03 |
| 5,543,590 | 8/1996 | Gillespie et al. ..................... 178/18.06 |
| 5,565,658 | 10/1996 | Gerpheide et al. .................. 178/18.02 |
| 5,670,755 | 9/1997 | Kwon ........................................ 178/19 |

FOREIGN PATENT DOCUMENTS

| | | | |
|---|---|---|---|
| WO 91/03039 | 3/1991 | WIPO . | |
| WO 97/18528 | 5/1997 | WIPO ............................ G06K 11/16 |

OTHER PUBLICATIONS

"Acoustic touch technology adds a new input dimension", Mark Platshon, Computer Design, Mar. 15, 1988.

Synaptics Brochure, "synaptics Touch pad," pp. 1–39.

*Primary Examiner*—Bipin Shalwala
*Assistant Examiner*—Vincent E. Kovalick
*Attorney, Agent, or Firm*—Townsend and Townsend and Crew LLP

[57] ABSTRACT

The present invention provides a touch pad which can detect a simply stylus using a change capacitance. The touch pad is made flexible, so that the stylus pressure compresses an insulating layer between a conductive reference layer and matrix of conductive traces. The compression causes a change in capacitance due to either the two capacitive conductive surfaces being closer to each other, or a variation of the dielectric value of the insulating layer due to the replacement of air in air gaps by the material of the insulating layer.

3 Claims, 3 Drawing Sheets

TOUCH AND PRESSURE SENSING METHOD AND APPARATUS

This application is a continuation-in-part of Ser. No. 08/637,099, filed Apr. 24, 1996.

BACKGROUND OF THE INVENTION

The present invention relates generally to touchpad devices, and more particularly relates to touchpad devices which detect both touch and pressure.

Touch sensing devices are well known, and take a number of different forms. Perhaps the best known are resistive-membrane position sensors, which have been used in a number of different applications for many years and basically respond to pressure. Such devices have been used as keyboards, position indicators, and so forth. Other types of touch sensing devices include resistive tablets, surface acoustic wave devices, touch sensors based on strain gages or pressure sensors, and optical sensors. The main advantage of pressure sensitive touch pads is that they can be used with a pen, and many applications for pressure sensitive involve their use as pen "digitizers," often as data entry devices.

Pressure sensitive position sensors have historically offered little benefit for use as a pointing device (as opposed to a data entry or writing device) because the pressure needed to make them operate inherently creates stiction between the finger and the sensor surface. Such stiction has, in large measure, prevented such devices from becoming popular.

Yet another touch sensing technology is capacitive sensing, in which the location of a finger (or in some instances another object such as a stylus) over a sensing device is determined by virtue of variations in capacitance under and around the location of the finger. Typical of capacitive touch sensing devices are touch screens and capacitive pads which employ a matrix of row and column electrodes and detect, for example, either the transcapacitance between row and column electrodes or the effective capacitance to virtual ground. Other capacitive techniques are also known. Some touch sensitive devices are known to use interpolation for more precisely identifying the location of a finger or a specialized stylus.

Capacitive touch sensing devices require little or no pressure, thus eliminating the stiction problem. This has led to them becoming accepted as very good pointing devices. Nevertheless, the capacitive sensing techniques used in such sensors typically require a relatively wide contact—i.e., a finger as opposed to the tip of a pen—which makes them less desirable for the classical data entry/digitizer application that is well suited to a stylus.

U.S. Pat. No. 5,543,590 discloses an example of a touchpad which capacitively detects a finger, and can also detect the pressure applied by the finger by detecting the size of the area of the touchpad which capacitively detects the finger. Assuming equal sized fingers on users, a larger area of capacitive detection is assumed to mean more pressure is applied.

While some recently developed touch pads are highly sophisticated and can detect very light touch, some users occasionally wish to use pens or other styli to contact the touch pad. Others primarily wish to use a stylus, but occasionally want to use touch. As a result, there is a need for a touch pad capable of high sensitivity both to detecting capacitively a finger touch and also detecting the small pressure footprint of a stylus.

SUMMARY OF THE INVENTION

The present invention provides a touch pad which can detect a simple stylus using a change in capacitance. The touch pad is made flexible, so that the stylus pressure compresses an insulating layer between a conductive reference layer and a matrix of conductive traces. The compression causes a change in capacitance due to either the two capacitive conductive surfaces being closer to each other, or a variation in the dielectric value of the insulating layer due to the replacement of air in air gaps by the material of the insulating layer.

In a preferred embodiment, the present invention can use circuitry such as that used to detect a human finger. A finger has the characteristic of varying capacitance simply by its proximity or touching of a touch pad, without any compression. A simple stylus (which does not have active components), on the other hand, will not similarly vary the capacitance in a normal touch pad. However, by utilizing the fact that the normal person writing with the stylus will apply some pressure, and that a stylus has a tip which is much more pointed than a finger, the stylus can compress the insulating layers sufficiently to be detected using the same circuitry which would detect a finger without compression.

These and other objects of the invention may be better appreciated from the following detailed description of the invention, taken together with the appended figures.

DESCRIPTION OF THE PREFERRED EMBODIMENT

Figure 1:
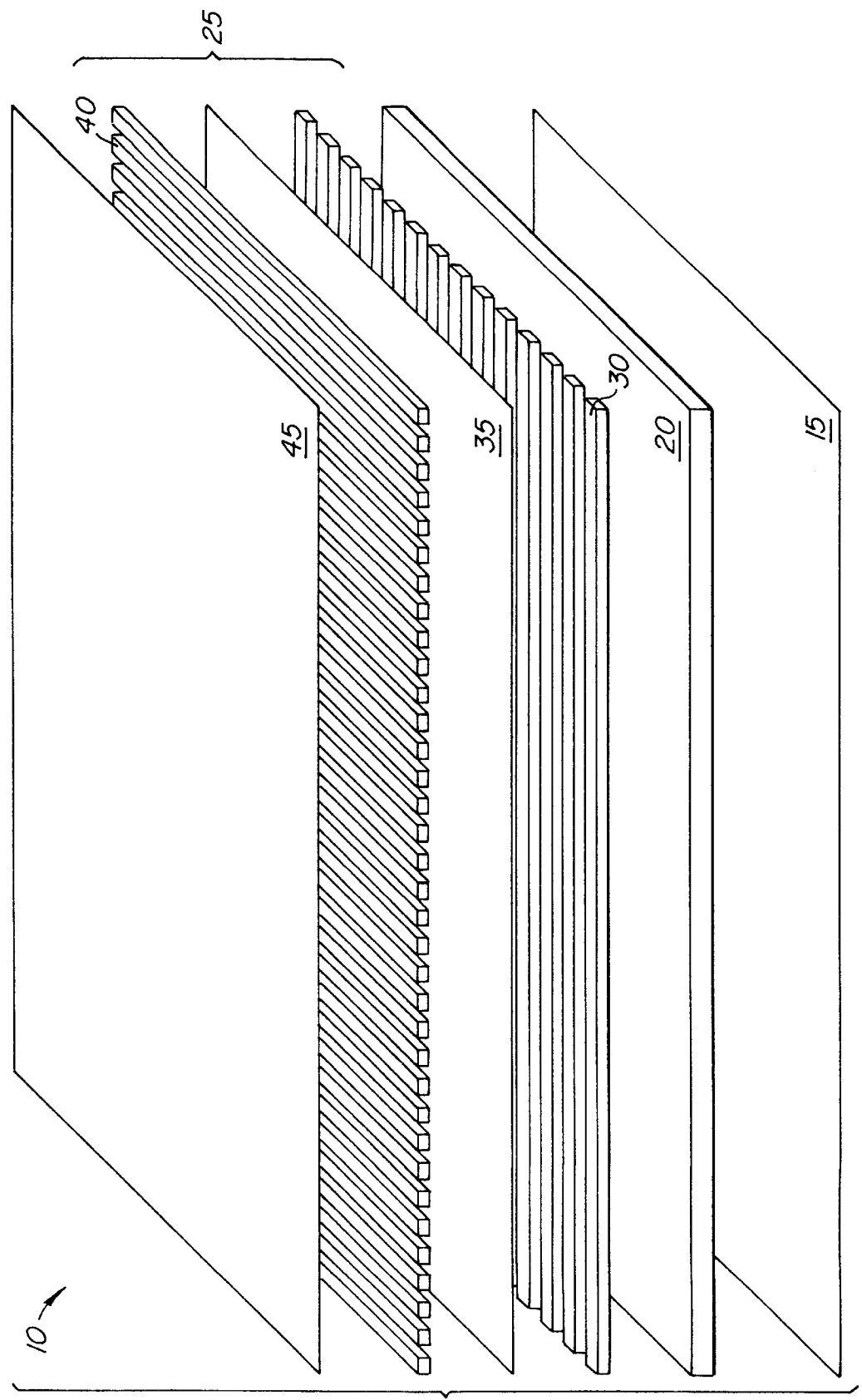
FIG. 1 shows an exploded perspective view of a first embodiment of a sensor according to the present invention.

Referring first to FIG. 1, a first embodiment of the present invention is shown in exploded perspective view. A touch pad sensor 10 comprises a ground plane 15, which may for example be copper or other suitable conductor. In a typical embodiment, the ground plane 15 is rigid, although some flexibility of the ground plane may be permitted or even desirable in certain embodiments. A layer of flexible material 20, which may be silicone or other suitably soft material, is disposed above the ground plane 15 and affixed thereto in any suitable manner. Many such materials have high adherence and require no additional adhesives or fixatives. The flexible material 20 can be made by any of a variety of techniques which allow sufficient displacement or compression to mechanically vary the distance between the traces and the ground plane, thus varying the capacitance. Just as some examples, the flexible material may be formed of a laminate or may be formed from a foam with air spaces.

An X-Y matrix 25 is disposed above the flexible material 20, and in a preferred embodiment is affixed thereto. The X-Y matrix is substantially identical to that disclosed in U.S. patent application Ser. No. 08/478,290 entitled Touch Sensing Method and Apparatus, filed Jun. 7, 1995, and assigned to the assignee of the present application, and incorporated herein by reference. X-Y matrix 25 comprises a layer of Y traces 30 arranged as a plurality of columns, an insulating layer 35, and a layer of X traces 40 arranged as a plurality of columns, an insulating layer 35, and a layer of X traces 40 arranged as a plurality of rows. Unlike typical prior art sensors, the insulating layer 35 is flexible in this embodiment. In prior art devices, the insulating layer is typically a rigid fiberglass substrate such as that used for printed circuit boards. In one embodiment of the present invention, the insulating layer 35 is a flexible PCB material such as polyester (with the X-Y traces formed from conductive ink) or suitable equivalent known in the art (such as Capton with thin copper). Because the insulating layer 35 is flexible in the present invention, the entire X-Y matrix 25 is also flexible.

Disposed above the X-Y matrix 25 is a flexible insulating layer 45, which may for example be comprised of Mylar™ and may be on the order of five mils thick. The insulating layer 45 provides the contact surface for either the finger(s) or a stylus, and is typically affixed to the X-Y matrix in any convenient fashion, such as by an adhesive.

Figure 2A:
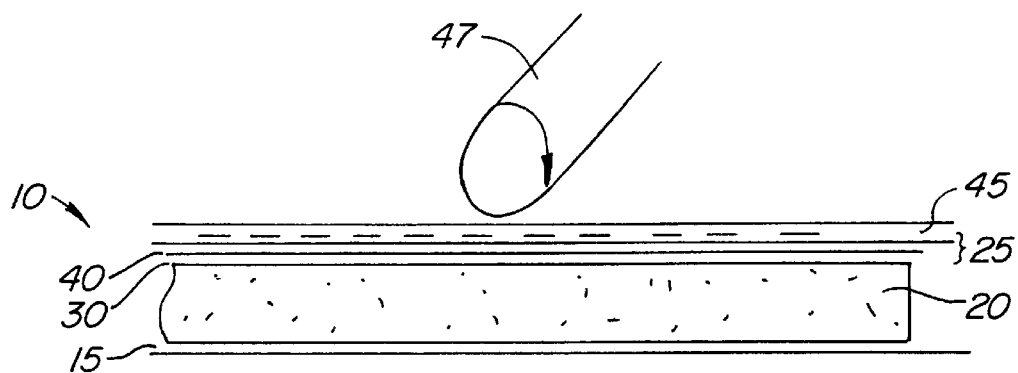
FIG. 2A shows a cross-sectional side view of the sensor of FIG. 1, when used with a finger.
Figure 2B:
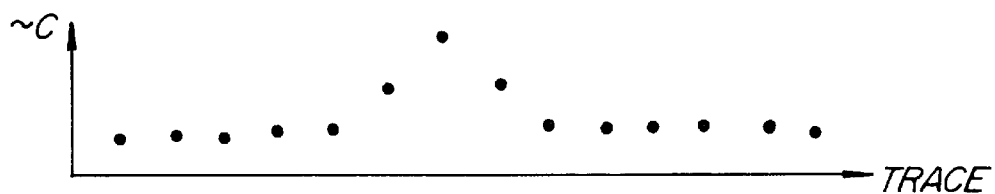
FIG. 2B depicts the output of the sensor of FIG. 1 in response to finger contact with the sensor.

Referring next to FIGS. 2A and 2B, the operation of the sensor 10 when used as a touch sensor may be better appreciated. The operation is substantially identical to that described in U.S. patent application Ser. No. 08/582,769 (entitled Touch Sensing Method and apparatus, filed Jan. 4, 1996, and assigned to the assignee of the present invention), the relevant portions of which are incorporated by reference. The capacitance of the finger 47 passing over the insulating layer 45 causes a sufficient change in the capacitance of the X and Y layer traces (with respect to ground) of the matrix 25 to be detectable with the sensing circuitry described in the referenced patent application. That change in capacitance creates, after appropriate signal manipulation, a finger profile such as that shown in FIG. 2B. It will be appreciated that FIG. 2B represents the finger profile detected on either the X traces or the Y traces.

Figure 3A:
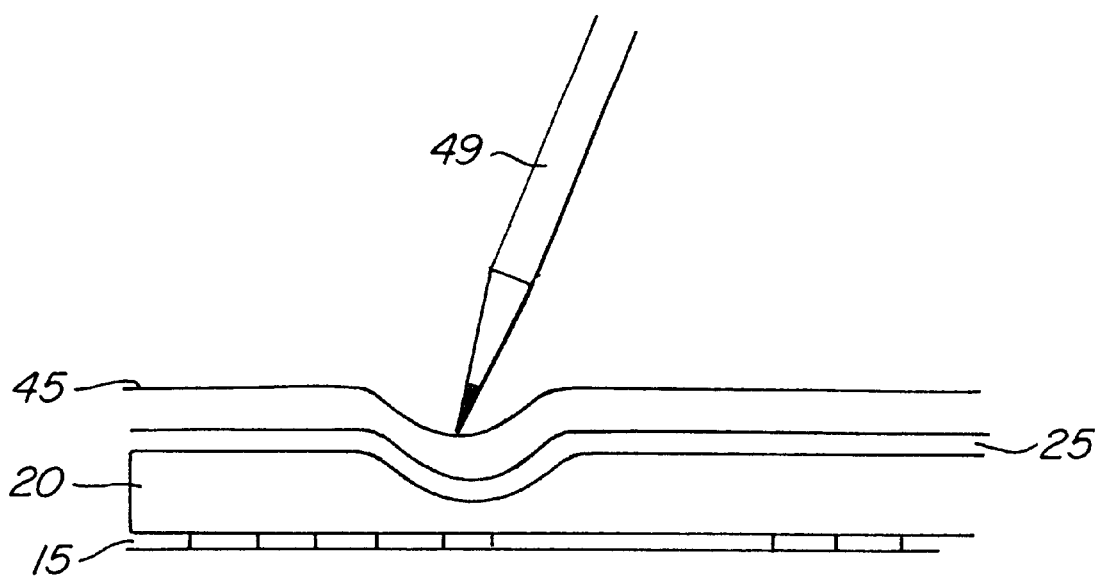
FIG. 3A shows a cross-sectional side view of the sensor of FIG. 1, when used with a stylus.
Figure 3B:
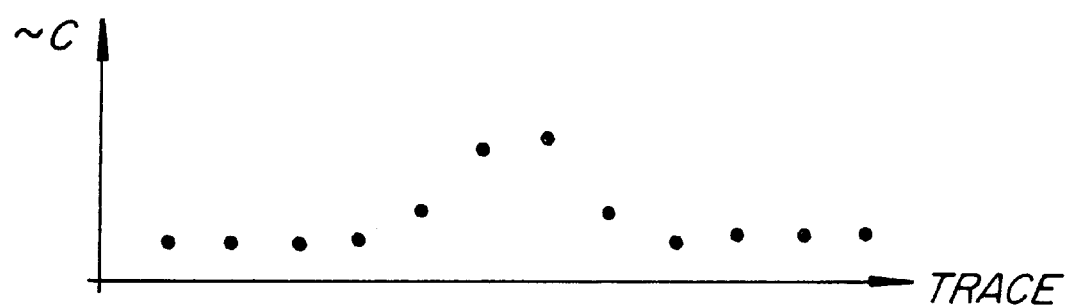
FIG. 3B depicts the output of the sensor of FIG. 1 in response to stylus pressure on the sensor.

Referring now to FIGS. 3A and 3B, the operation of the sensor 10 when used as a pressure sensor can be described in greater detail. As a stylus, such as a conventional pen, pencil or other suitably pointed device, is pressed into the upper layer 45 of the sensor 10, the pressure from the stylus 49 causes the layer 45 and the X-Y matrix to depress into the layer 20. The layer 20 thus becomes compressed or displaced slightly, or becomes thinner, moving the Y traces 30 and X traces 40 into mechanically closer proximity to the ground plane 15. This, in turn, causes capacitance to change, since the ground plane may the thought of as one plate of a capacitor, while the traces form the other plate. The changing capacitances can be brought about by one or the other, or combination of, varying the distance between the two capacitive plates, and varying the dielectric value of the insulating layer. The distance is obviously varied as the two plates are pushed closer together. However, this by itself may not produce a sufficient change in the capacitance. By choosing an insulating layer which includes air gaps, the compression will expel the air, replacing it with the compressed material, significantly changing the effective dielectric constant of the portion of the insulating layer being compressed since the dielectric value of air is replaced by the dielectric value of the insulating material.

Sensing circuitry such as that described in U.S. patent application Ser. No. 08/582,769 can then detect the change in capacitance resulting from the pressure of the stylus, yielding a pressure profile such as that shown in FIG. 3B. It will be appreciated that the stylus profile may be slightly sharper than the finger profile. The result is that the sensor successfully detects both pressure and touch, and yields accurate results with either technique.

In some embodiments, it may be desirable to adjust the variation in capacitance which results from pressure to match that change in capacitance caused by touch. This is desirable to ensure that the output signal from the sensor in response to touch is approximately the same amplitude as the output signal from the sensor in response to pressure, thus simplifying downstream circuit design. Those skilled in the art will appreciate that the stiffness of the layer 20 may be readily adjusted to ensure that the movement of the traces toward the ground plane is limited mechanically to allow only an acceptable percentage of change. Alternately, or in addition, an insulating material with an appropriate dielectric value can be chosen. Modern touch sensing circuits are capable of detecting capacitance variations on the order of one percent; the variation in the separation of the ground plane from the traces can be calculated accordingly.

Figure 4:
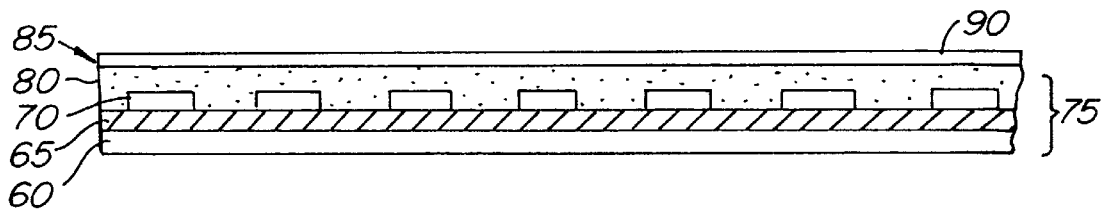
FIG. 4 shows a cross-sectional side view of a second embodiment of the invention.

In addition to the first embodiment described above, another embodiment is shown in cross-sectional side view in FIG. 4. The second embodiment of a touch/pressure sensor according to the present invention can be seen to include at the bottom thereof a plurality of X traces 60 affixed to a rigid substrate 65, such as conventional printed circuit board substrate. On the opposite side of the substrate 65 are a plurality of Y traces 70, so that the traces 60 and 70, together with the substrate 65, form an X-Y matrix 75. A flexible, displaceable material such as silicone forms a layer 80 which insulates the Y traces 70 from a flexible ground plane 85. An insulating film 90 may be placed over the ground plane 85.

Operation of the embodiment is similar to that of the embodiment of FIG. 1. Pressure from a finger, pen or other stylus against the insulating film 90 and ground plane 85 compresses or displaces the layer 80 and moves the flexible ground plane 85 toward the conductive traces. This causes a localized change in capacitance around the pressure point which can be detected as described previously.

It will be appreciated from the foregoing that the present invention allows both touch and pressure gestures to be detected and converted—through appropriate logic—to mouse-related functions for moving a cursor and control of operating environments or applications programs.

Having fully described various embodiments of the present invention, numerous alternatives and equivalents which do not depart from the invention will be apparent to those skilled in the art. For example, instead of a foam like or silicon like material having a plurality of small air gaps throughout, a laminate could be used with a flexible insulating layer over or underneath a air gap, wherein the air gap is a plane underneath the entire touch pad surface.

It is therefore intended that the invention not be limited by the foregoing description, but only by the appended claims.

What is claimed is:

1. A touchpad comprising:

a conductive reference layer;

a matrix of conductive traces;

an insulating layer mounted between said reference layer and said matrix, said insulating layer and one of said reference layer and said matrix being displaceable in response to applied pressure to vary a distance between said reference layer and said matrix; and a capacitance measuring circuit connected between said matrix and said reference layer;

wherein said reference layer is flexible and said matrix is rigid.

2. A touchpad comprising:

a conductive reference layer;

a matrix of conductive traces;

an insulating layer mounted between said reference layer and said matrix, said insulating layer and one of said reference layer and said matrix being displaceable in response to applied pressure to vary a distance between said reference layer and said matrix; and a capacitance measuring circuit connected between said matrix and said reference layer;

wherein said insulating layer is constructed such that a compression caused by a stylus causes a change in capacitance of the same order of magnitude as a change in capacitance caused by a finger on a surface of said touchpad without compressing said insulating layer.

3. A touchpad comprising:

a conductive reference layer;

a matrix of conductive traces;

an insulating layer mounted between said reference layer and said matrix, said insulating layer and one of said reference layer and said matrix being displaceable in response to applied pressure to vary a distance between said reference layer and said matrix, said insulating layer being constructed such that a compression caused by a stylus causes a change in capacitance of the same order of magnitude as a change in capacitance caused by a finger on a surface of said touchpad without compressing said insulating layer; and a capacitance measuring circuit connected between said matrix and said reference layer, said capacitance measuring circuit being configured to determine a trace in each orthogonal direction in said matrix of conductive traces corresponding to a maximum change in capacitance.

* * * * *